United States Patent
Chu et al.

(10) Patent No.: US 11,523,306 B1
(45) Date of Patent: Dec. 6, 2022

(54) TRAFFIC CHARACTERISTICS FOR TARGET WAKE TIME (TWT) NEGOTIATION

(71) Applicant: Marvell Asia Pte, Ltd., Singapore (SG)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 15 days.

(21) Appl. No.: 16/889,788

(22) Filed: Jun. 1, 2020

Related U.S. Application Data

(60) Provisional application No. 62/854,834, filed on May 30, 2019.

(51) Int. Cl.
*H04W 28/18* (2009.01)
*H04L 69/324* (2022.01)
*H04W 52/02* (2009.01)
*H04W 84/12* (2009.01)

(52) U.S. Cl.
CPC .......... *H04W 28/18* (2013.01); *H04L 69/324* (2013.01); *H04W 52/0216* (2013.01); *H04W 84/12* (2013.01)

(58) Field of Classification Search
CPC .. H04W 72/0453; H04W 84/12; H04L 5/001; H04L 69/323; H04L 5/0037
See application file for complete search history.

(56) References Cited

U.S. PATENT DOCUMENTS

| | | | |
|---|---|---|---|
| 10,904,834 B1* | 1/2021 | Noh | H04W 72/1205 |
| 10,952,245 B1* | 3/2021 | Smith | H04W 72/12 |
| 2017/0257888 A1* | 9/2017 | Kneckt | H04W 74/0816 |
| 2018/0132175 A1* | 5/2018 | Choi | H04W 72/0446 |
| 2018/0227917 A1* | 8/2018 | Li | H04W 72/042 |
| 2019/0082390 A1* | 3/2019 | Azizi | H04L 5/0053 |
| 2019/0123863 A1 | 4/2019 | Zhang et al. | |
| 2019/0182714 A1 | 6/2019 | Chu et al. | |
| 2019/0182863 A1 | 6/2019 | Chu et al. | |
| 2019/0306685 A1* | 10/2019 | Cariou | H04W 72/0446 |
| 2019/0349930 A1 | 11/2019 | Chu et al. | |
| 2020/0221262 A1* | 7/2020 | Lepp | H04W 76/40 |
| 2020/0236624 A1* | 7/2020 | Kim | H04W 76/28 |
| 2020/0288523 A1* | 9/2020 | Patil | H04W 80/02 |
| 2021/0007168 A1* | 1/2021 | Asterjadhi | H04W 76/15 |

(Continued)

OTHER PUBLICATIONS

IEEE P802.11ah™/D5.0 "Draft Standard for Information Technology—Telecommunications and information exchange between systems Local and metropolitan area networks—Specific requirements, Part 11: Wireless LAN Medium Access Control (MAC) and Physical Layer (PHY) Specifications: Amendment 2: Sub 1 GHz License Exempt Operation," The Institute of Electrical and Electronics Engineers, Inc., pp. 1-632 (Mar. 2015).

(Continued)

*Primary Examiner* — Syed Ali

(57) ABSTRACT

A first communication device generates a frame that includes i) requested values of parameters of a target wake time (TWT) schedule in a wireless local area network (WLAN), and ii) information regarding traffic characteristics of data units that will be communicated during the TWT schedule. As part of negotiating the TWT schedule, the first communication device transmits the frame to a second communication device that will participate in the TWT schedule.

18 Claims, 6 Drawing Sheets

(56) References Cited

U.S. PATENT DOCUMENTS

2021/0014784 A1* 1/2021 Kneckt ............. H04W 52/0209
2021/0022154 A1* 1/2021 Cavalcanti .......... H04W 74/006

OTHER PUBLICATIONS

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Zhang et al., "EHT Technology Candidate Discussions," doc: IEEE 802.11-18/1161r0, *The Institute of Electrical and Electronics Engineers, Inc.*, pp. 1-10 Jul. 8, 2018.

* cited by examiner

*FIG. 3*

| Element ID 304 | Length 316 | TS Info 320 | Nominal MSDU Size 324 | Maximum MSDU Size 328 | Minimum Service Int. 332 | Maximum Service Int. 334 | Inactivity Int. 336 | Suspension Int. 340 |

| Service Start Time 344 | Min. Data Rate 348 | Mean Data Rate 352 | Peak Data Rate 356 | Burst Size 360 | Delay Bound 364 | Min. PHY Rate 368 | Surplus BW Allow. 372 | Medium Time 376 |

300

TRAFFIC CHARACTERISTICS FOR TARGET WAKE TIME (TWT) NEGOTIATION

CROSS REFERENCES TO RELATED APPLICATIONS

This application claims the benefit of U.S. Provisional Patent Application No. 62/854,834, entitled "Traffic Specification Announcement for Target Wake Time (TWT) Negotiation," filed on May 30, 2019, which is incorporated herein by reference in its entirety.

FIELD OF TECHNOLOGY

The present disclosure relates generally to wireless communication systems, and more particularly to power saving techniques in wireless local area networks (WLANs).

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. Work has now begun on a new iteration of the IEEE 802.11 Standard, which is referred to as the IEEE 802.11be Standard, or Extremely High Throughput (EHT) WLAN. The IEEE 802.11be Standard promises to provide greater throughput by permitting communication channels having frequency bandwidths of up to 320 MHz (or perhaps even more) and/or allowing the formation of separate communication links in different frequency segments.

The current draft of the IEEE 802.11ax Standard (referred to herein as "the IEEE 802.11ax Standard" for simplicity) provides mechanisms for a client station in a WLAN to negotiate with an access point (AP) a schedule for the client station to transition between a wake state and a doze state. The schedule is sometimes referred to as an "individual target wake time agreement", or "individual TWT agreement". The individual TWT agreement includes a designated time period (sometimes referred to as an "individual TWT service period" or "individual TWT SP") at which the client station typically transitions to the wake state and remains in the wake state for a duration of the individual TWT SP. The client station then returns to the doze state at an end of the individual TWT SP. The client station and the AP exchange packets while the client station is in the wake state, and the AP buffers frames intended for the client station while the client station is in the doze state.

The AP may also set up broadcast TWT schedules that specifies respective broadcast TWT SPs. The AP may advertise, in beacon frames, the broadcast TWT schedules and a client station may join a particular broadcast TWT SP. During a broadcast TWT SP, client stations that have joined the broadcast TWT SP transition to the wake state and remain in the wake state for a duration of the broadcast TWT SP. The client stations then return to the doze state at an end of the broadcast TWT SP. The client stations that have joined the broadcast TWT schedule and the AP exchange multi-user (MU) packets during the broadcast TWT SP. While client stations are in the doze state, the AP buffers frames intended or the client stations.

The use of TWT agreements by an AP is useful for minimizing contention between client stations in a WLAN and/or reducing power consumption by client stations.

SUMMARY

In an embodiment, a method for negotiating a target wake time (TWT) schedule in a wireless local area network (WLAN) includes: generating, at a first communication device, a frame that includes i) requested values of parameters of the TWT schedule and ii) information regarding traffic characteristics of data units that will be communicated during the TWT schedule; and as part of negotiating the TWT schedule, transmitting, by the first communication device, the frame to a second communication device that will participate in the TWT schedule.

In another embodiment, a first communication device comprises a wireless network interface device having one or more integrated circuit (IC) devices. The one or more IC devices are configured to: generate a frame that includes i) requested values of parameters of a TWT schedule in a WLAN, and ii) information regarding traffic characteristics of data units that will be communicated during the TWT schedule; and control the wireless network interface device to the frame to a second communication device that will participate in the TWT schedule as part of negotiating the TWT schedule with the second communication device.

In yet another embodiment, a method for providing information regarding a broadcast TWT schedule in a WLAN includes: generating, at a first communication device, a beacon frame that includes i) parameters of the broadcast TWT schedule and ii) information regarding a quantity of client stations that have currently joined the broadcast TWT schedule; and transmitting, by the first communication device, the beacon frame to inform one or more second communication devices of i) the parameters of the broadcast TWT schedule and ii) the quantity of client stations that have currently joined the broadcast TWT schedule.

In still another embodiment, a first communication device comprises a wireless network interface device having one or more IC devices. The one or more IC devices are configured to: generate a beacon frame that includes i) parameters of a broadcast TWT schedule in a WLAN, and ii) information regarding a quantity of client stations that have currently joined the broadcast TWT schedule; and control the wireless network interface device to transmit the beacon frame to inform one or more second communication devices of i) the parameters of the broadcast TWT schedule and ii) the quantity of client stations that have currently joined the broadcast TWT schedule.

BRIEF DESCRIPTION OF THE DRAWINGS

FIG. 3 is a diagram of an example traffic stream specification (TSPEC) information element included in the example TWT setup frame of FIG. 2, according to an embodiment.

DETAILED DESCRIPTION

The IEEE 802.11ax Standard does not provide a mechanism for an access point (AP) in a wireless local area network (WLAN) to know traffic characteristics of a client station when negotiating a target wake time (TWT) agreement with the client station. In some embodiments described below, a client station provides traffic characteristic information within frames exchanged during a negotiation of a TWT agreement. Providing the AP with traffic characteristic information of a client station during a negotiation of a TWT agreement assists the AP in scheduling TWT SPs that better match the traffic characteristics of a client station, thus improving system throughput and/or client power saving, at least in some embodiments.

Additionally, the IEEE 802.11ax Standard does not provide a mechanism for a client station to know load information regarding broadcast TWT schedules (e.g., how many other client stations have joined each broadcast TWT schedule) when the client station is selecting a broadcast TWT schedule to join. In some embodiments described below, an AP provides load information regarding broadcast TWT schedules within beacon frames, for example. Providing client stations with load information regarding broadcast TWT schedules assists client stations in avoiding broadcast TWT schedules that are already heavily loaded and/or selecting broadcast TWT schedules that are relatively less loaded, thus improving system throughput and/or client power saving, at least in some embodiments.

Figure 1:
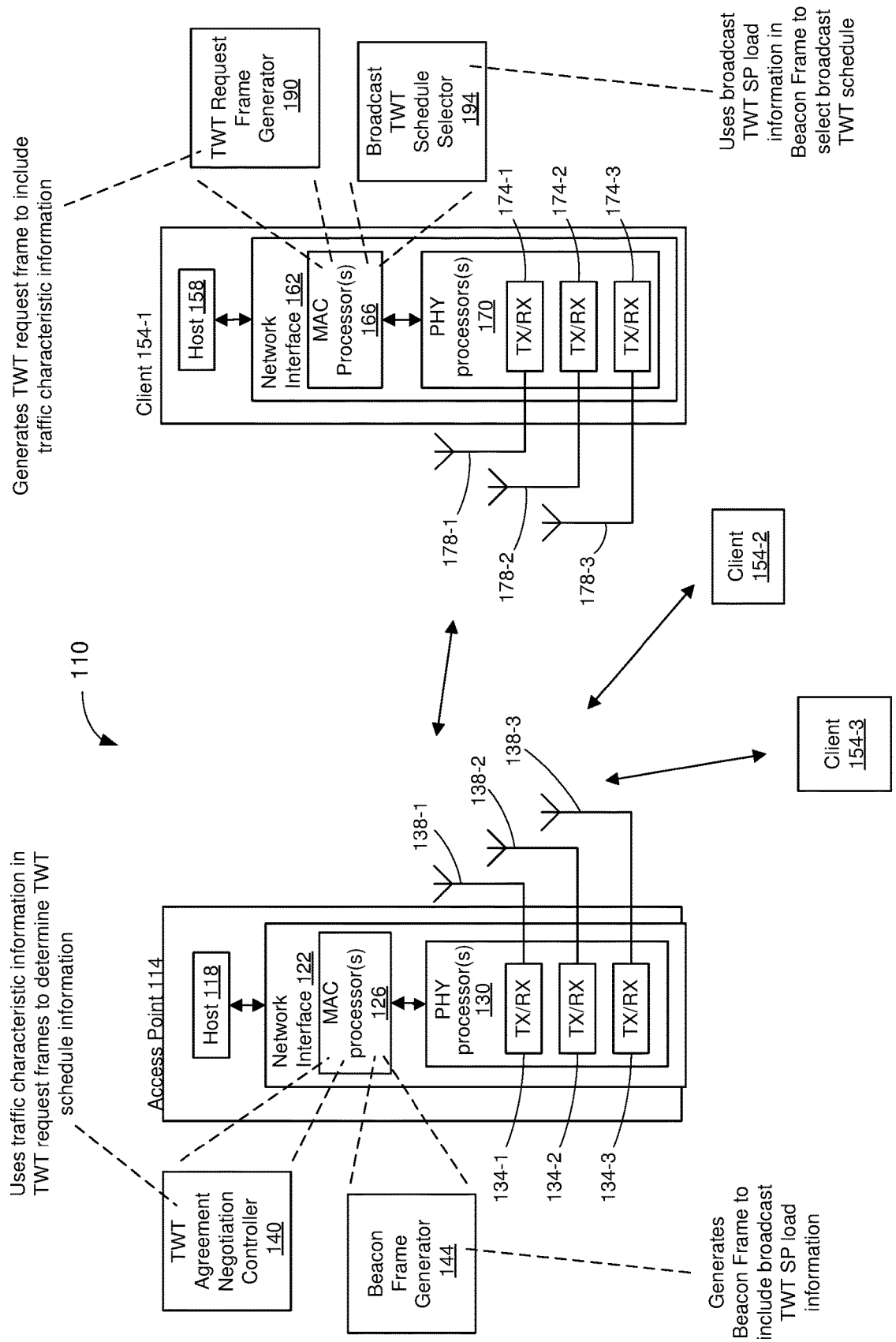
FIG. 1 is a block diagram of an example wireless local area network (WLAN) in which communication devices negotiate target wake time (TWT) schedules and generate/transmit TWT-related frames such as described herein, according to an embodiment.

FIG. 1 is a diagram of an example WLAN 110 that uses multiple communication links in multiple frequency segments or in different radio frequency (RF) bands, according to an embodiment. The WLAN 110 includes an access point (AP) 114 that comprises a host processor 118 coupled to a wireless network interface device 122. The wireless network interface device 122 includes one or more medium access control (MAC) processors 126 (sometimes referred to herein as "the MAC processor 126" for brevity) and one or more PHY processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the wireless network interface device 122 is configured for operation within a single RF band at a given time. In an embodiment, the wireless network interface device 122 is configured to simultaneously communicate via multiple communication links in respective frequency segments within a single RF band, and/or to communicate via the multiple communication links at different times. In another embodiment, the wireless network interface device 122 is additionally configured for operation within two or more RF bands at the same time or at different times. For instance, in an embodiment, the wireless network interface device 122 is configured to the wireless network interface device 122 is configured to simultaneously communicate via multiple communication links in respective RF bands, and/or to communicate via the multiple communication links at different times. In an embodiment, the wireless network interface device 122 includes multiple PHY processors 130, where respective PHY processors 130 correspond to respective RF bands. In another embodiment, the wireless network interface device 122 includes a single PHY processor 130, where each transceiver 134 includes respective RF radios corresponding to respective RF bands.

The wireless network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. The first IC and the second IC may be packaged together in a single IC package thereby forming a modular device, or the first IC and the second IC may be coupled together on a single printed board, for example, in various embodiments. As another example, at least a portion of the MAC processor 126 and at least a portion of the PHY processor 130 may be implemented on a single IC. For instance, the wireless network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the wireless network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 is configured to generate MAC layer data units such as MAC service data units (MSDUs), MAC protocol data units (MPDUs), etc., and provide the MAC layer data units to the PHY processor 130. Additionally, the MAC processor 126 is configured to select communication links via which MAC layer data units should be transmitted and to control the PHY processor 130 so that the MAC layer data units are transmitted in the selected communication links, in some embodiments. Also, the MAC processor 126 is configured to determine when the respective communication links are idle and available for transmission and to control the PHY processor 130 so that MAC layer data units are transmitted when respective communication links are idle, in some embodiments. Additionally, the MAC processor 126 is configured to determine when client stations are in a sleep state and therefore unavailable to transmit or receive, in some embodiments. For example, the MAC processor 126 is configured to negotiate a schedule with a client station for when the client station is permitted to be in the sleep state and when the client station should be in a wake state and available to transmit to or receive from the AP 114, according to some embodiments.

The PHY processor 130 may be configured to receive MAC layer data units from the MAC processor 126 and to encapsulate the MAC layer data units to generate PHY data units such as PHY protocol data units (PPDUs) for transmission via the antennas 138. Similarly, the PHY processor 130 may be configured to receive PHY data units that were received via the antennas 138, and to extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more RF signals for transmission, the PHY processor 130 is configured to process (which may include modulation, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulation, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., in various embodiments.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In other embodiments, the MAC processor 126 additionally or alternatively includes one or more hardware state machines.

The MAC processor 126 includes, or implements, a TWT agreement negotiation controller 140 that is configured to use traffic characterization information from client stations to determine TWT service periods (SPs), according to some embodiments. For example, as is described in more detail below, a client station is configured to include, within a TWT request frame transmitted by the client station during a TWT agreement negotiation, traffic characteristic information for the client station, and the TWT agreement negotiation controller 140 uses the traffic characteristic information to determine TWT schedule information as part of the TWT agreement negotiation, according to an embodiment. The traffic characteristic information relates to packets that that the client station will be transmitting, or expects to receive, during a TWT schedule, according to an embodiment. An illustrative example of traffic characteristic information is quality of service (QoS) requirement information regarding MAC layer data units (e.g., MPDUs) that the client station will be transmitting and/or expects to receive during the TWT schedule. Another illustrative example of traffic characteristic information is priority information regarding MAC layer data units (e.g., MPDUs) that the client station will be transmitting and/or expects to receive during the TWT schedule. Other examples of traffic characteristic information include data unit (e.g., MPDU) length information, a minimum data rate, a maximum data rate, a maximum latency, etc., regarding packets that a client station will be transmitting, or expects to receive, during a TWT schedule, according to various.

In an embodiment, the TWT agreement negotiation controller 140 is implemented by a processor executing machine readable instructions stored in a memory, where the machine readable instructions cause the processor to perform acts described in more detail below. In another embodiment, the TWT agreement negotiation controller 140 additionally or alternatively comprises hardware circuitry that is configured to perform acts described in more detail below. In some embodiments, the hardware circuitry comprises one or more hardware state machines that are configured to perform acts described in more detail below.

Additionally or alternatively, the MAC processor 126 includes, or implements, a beacon frame generator 144 that is configured to generate beacon frames that include load information regarding one or more broadcast TWT schedule, according to some embodiments. An example of load information regarding a broadcast TWT schedule is a number of client stations that have joined the broadcast TWT schedule, according to an embodiment. For example, as is described in more detail below, a client station is configured to use such load information, received in a beacon frame, to select a broadcast TWT schedule from among multiple broadcast TWT schedules with different loads.

In an embodiment, the beacon frame generator 144 is implemented by a processor executing machine readable instructions stored in a memory, where the machine readable instructions cause the processor to perform acts described in more detail below. In another embodiment, the beacon frame generator 144 additionally or alternatively comprises hardware circuitry that is configured to perform acts described in more detail below. In some embodiments, the hardware circuitry comprises one or more hardware state machines that are configured to perform acts described in more detail below.

In other embodiments, the TWT agreement negotiation controller 140 and/or the beacon frame generator 144 are omitted from the AP 114.

The WLAN 110 also includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a wireless network interface device 162. The wireless network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

In an embodiment, the wireless network interface device 162 is configured for operation within a single RF band at a given time. In another embodiment, the wireless network interface device 162 is configured for operation within two or more RF bands at the same time or at different times. For example, in an embodiment, the wireless network interface device 162 includes multiple PHY processors 170, where respective PHY processors 170 correspond to respective RF bands. In another embodiment, the wireless network interface device 162 includes a single PHY processor 170, where each transceiver 174 includes respective RF radios corresponding to respective RF bands. In an embodiment, the wireless network interface device 162 includes multiple MAC processors 166, where respective MAC processors 166 correspond to respective RF bands. In another embodiment, the wireless network interface device 162 includes a single MAC processor 166 corresponding to the multiple RF bands.

The wireless network interface device 162 is implemented using one or more ICs configured to operate as discussed below. For example, the MAC processor 166 may be implemented on at least a first IC, and the PHY processor 170 may be implemented on at least a second IC. The first IC and the second IC may be packaged together in a single IC package thereby forming a modular device, or the first IC and the second IC may be coupled together on a single printed board, for example, in various embodiments. As another example, at least a portion of the MAC processor 166 and at least a portion of the PHY processor 170 may be implemented on a single IC. For instance, the wireless network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the wireless network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. Additionally, the MAC processor 166 is configured to select communication links via which MAC layer data units should be transmitted and to control the PHY processor 170 so that the MAC layer data units are transmitted in the selected communication links, in some embodiments. Also, the MAC processor 166 is configured to determine when the respective communication links are idle and available for transmission and to control the PHY processor 170 so that MAC layer data units are transmitted when respective communication links are idle, in some embodiments. Additionally, the MAC processor 166 is configured to control when portions of the wireless network interface device 162 are in a sleep state or a wake state, for example to conserve power, in some embodiments. For example, the MAC processor 166 is configured to negotiate a schedule with the AP 114 for when the client station 154-1 is permitted to be in the sleep state and when the client station 154-1 should be in a wake state and available to transmit to or receive from the AP 114, according to some embodiments.

The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

The MAC processor 166 includes, or implements, a TWT request frame generator 190 that is configured to, as part of negotiating a TWT agreement with the AP 114, generate a TWT request frame that includes traffic characteristic information for the client station, according to an embodiment. As discussed above, the AP 114 uses such traffic characteristic information to determine TWT schedule information as part of the TWT agreement negotiation, according to an embodiment.

In an embodiment, the TWT request frame generator 190 is implemented by a processor executing machine readable instructions stored in a memory, where the machine readable instructions cause the processor to perform acts described in more detail below. In another embodiment, the TWT request frame generator 190 additionally or alternatively comprises hardware circuitry that is configured to perform acts described in more detail below. In some embodiments, the hardware circuitry comprises one or more hardware state machines that are configured to perform acts described in more detail below.

Additionally or alternatively, the MAC processor 166 includes, or implements, a broadcast TWT schedule selector 194 that is configured to uses load information regarding multiple broadcast TWT schedules to select a broadcast TWT schedule from among the multiple broadcast TWT schedules, according to an embodiment. As discussed above, an example of load information regarding a broadcast TWT schedule is a number of client stations that have joined the broadcast TWT schedule, according to an embodiment. In an embodiment, the AP 114 includes the load information regarding multiple broadcast TWT schedules in beacon frames.

In an embodiment, the broadcast TWT schedule selector 194 is implemented by a processor executing machine readable instructions stored in a memory, where the machine readable instructions cause the processor to perform acts described in more detail below. In another embodiment, the beacon frame generator 144 additionally or alternatively comprises hardware circuitry that is configured to perform acts described in more detail below. In some embodiments, the hardware circuitry comprises one or more hardware state machines that are configured to perform acts described in more detail below.

In other embodiments, the TWT request frame generator 190 and/or the broadcast TWT schedule selector 194 are omitted from the client station 154-1.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
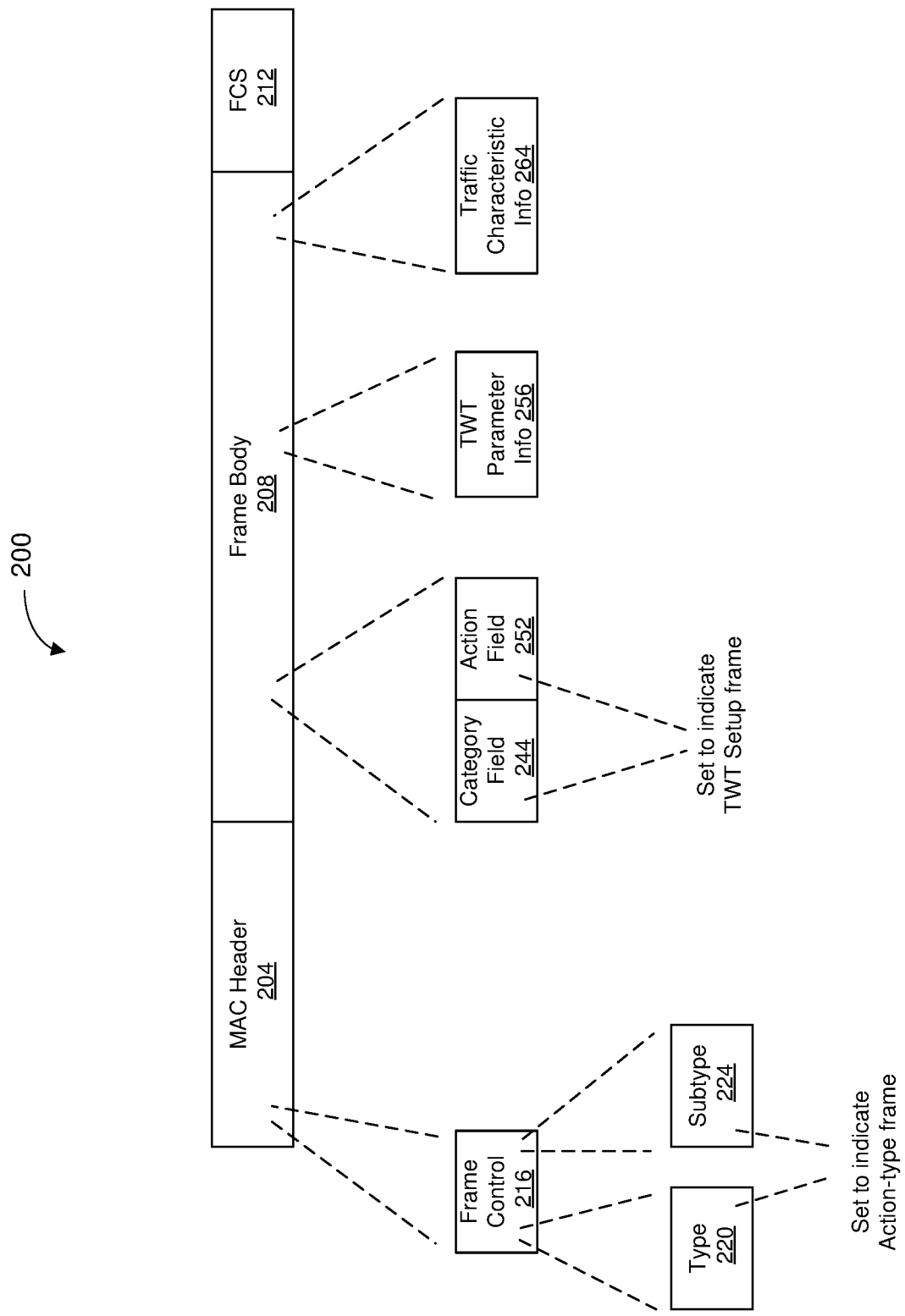
FIG. 2 is a diagram of an example TWT setup frame transmitted in the example WLAN of FIG. 1, according to an embodiment.

FIG. 2 is a diagram of an example TWT request frame 200 that a communication device in a WLAN generates and transmits as part of negotiating an individual TWT agreement or a broadcast TWT agreement, according to various embodiments. For example, the network interface device 162 of the client station 154-1 (FIG. 1) is configured to generate and transmit the TWT request frame 200 as part of negotiating an individual or broadcast TWT agreement with the AP 114, according to an embodiment. For instance, the MAC processor 166 is configured to (e.g., the TWT request frame generator 190, etc.) generate and transmit the TWT request frame 200, according to an embodiment. The example TWT request frame 200 is described with reference to FIG. 1 merely for explanatory purposes. In other embodiments, the TWT request frame 200 is generated and transmitted in other suitable wireless communication networks and/or generated/transmitted/processed by other suitable wireless communication devices in other embodiments.

The TWT request frame 200 is useful, for example, for providing traffic characteristic information to an AP during a negotiation over an individual or broadcast TWT agreement, according to some embodiments.

The TWT request frame 200 includes a MAC header 204, a frame body 208, and a frame check sequence (FCS) field 212, according to an embodiment. The FCS field 212 includes error detection information (e.g., cyclic redundancy check (CRC) information) corresponding to the MAC header 204 and the frame body 208, according to an embodiment.

The MAC header 204 includes a frame control field 216 having MAC layer information regarding the management frame 200. The frame control field 216 includes a type subfield 220 and a subtype subfield 224 set to indicate the frame 200 is an action-type frame. As a result of setting the type subfield 220 and the subtype subfield 224 to indicate an action-type frame, receivers will assume the frame body 208 will have a format of an action-type frame when processing the frame 200. For example, the receivers will assume that the frame body 208 includes a category field 244.

The category field 244 is set to value that indicates that the frame body 208 also includes an action field 252. The action field 252 is set to a value that indicates that the frame 200 is a TWT setup frame, which indicates to receiver devices that the frame body 208 has a particular format corresponding to TWT setup frames.

The frame body 208 includes TWT parameter information corresponding to requested parameters for an individual or broadcast TWT schedule that is being negotiated. In various embodiments, the requested parameters comprise one of, or any suitable combination of two or more of, i) a start time of an TWT SP that is part of the TWT schedule, ii) a time period between TWT SPs of the TWT schedule, and iii) a duration of each TWT SP of the TWT schedule.

The frame body 208 includes traffic characteristic information 264 for the client station that is generating/transmitting the frame 200. In some embodiments, the traffic characteristic information 264 includes QoS requirement information regarding MAC layer data units (e.g., MPDUs) that the client station will be transmitting and/or expects to receive during the TWT schedule. In some embodiments, the traffic characteristic information 264 includes priority information regarding MAC layer data units (e.g., MPDUs) that the client station will be transmitting and/or expects to receive during the TWT schedule.

In some embodiments, at least some MAC layer data units (e.g., MPDUs) transmitted in a WLAN correspond to multiple traffic classes, where each traffic class is associated with a particular traffic type (e.g., network control, video, voice, streaming multimedia, etc.). For example, in an embodiment, the traffic classes are associated with QoS requirements and/or priority levels (e.g., background, best effort, video, voice, etc.). In some embodiments, the traffic characteristic information 264 includes an indication of a traffic class regarding MAC layer data units (e.g., MPDUs) that the client station will be transmitting and/or expects to receive during the TWT schedule.

In some embodiments, a traffic stream comprises a set of MAC layer data units (e.g., MPDUs) to be delivered subject to certain QoS requirements. In some embodiments, the traffic characteristic information 264 includes an indication of a traffic stream that the client station will be transmitting and/or expects to receive during the TWT schedule.

In some embodiments, the traffic characteristic information 264 includes throughput and/or data rate information regarding MAC layer data units (e.g., MPDUs) that the client station will be transmitting and/or expects to receive during the TWT schedule. For example, the traffic characteristic information 264 includes one of, or any suitable combination of two or more of, i) a minimum data rate, ii) a mean data rate, iii) a peak data rate, iv) a burst size, v) a delay bound, vi) a minimum PHY rate, etc., regarding packets that the client station will be transmitting and/or expects to receive during the TWT schedule.

In some embodiments, the traffic characteristic information 264 includes an information element that contains a set of parameters that define characteristics and QoS expectations of a traffic flow that the client station expects during the TWT schedule. In some embodiments, the traffic characteristic information 264 includes a single information element that contains respective sets of parameters that define respective characteristics and QoS expectations of respective traffic flows that the client station expects during the TWT schedule. In some embodiments, the traffic characteristic information 264 includes respective different information elements that contain respective sets of parameters that define respective characteristics and QoS expectations of respective traffic flows that the client station expects during the TWT schedule.

In one embodiment, the traffic characteristic information 264 includes a traffic specification (TSPEC) information element that that contains a set of parameters that define characteristics and QoS expectations of a traffic flow that the client station expects during the TWT schedule. In some embodiments, the TSPEC information element included in the traffic characteristic information 264 is the same as or similar to the TSPEC information element defined by the current draft of the IEEE 802.11ax Standard. In some embodiments, the TSPEC information element included in the traffic characteristic information 264 is similar to the TSPEC information element defined by the current draft of the IEEE 802.11ax Standard, but is modified to include respective sets of parameters that define respective characteristics and QoS expectations of respective traffic flows that the client station expects during the TWT schedule.

FIG. 3 is a diagram of an example TSPEC information element 300 that is included in the frame body 208 of the TWT setup frame 200 of FIG. 2, according an embodiment. The TSPEC information element 300 includes an element identifier (ID) field 304 that identifies the information element 300 as a TSPEC information element, and thus indicates to a receiver a format of the information element 300. The TSPEC information element 300 also includes length field 316 that indicates a length of the TSPEC information element 300.

A traffic stream (TS) information field 320 includes information regarding a traffic stream that the client station will be transmitting and/or expects to receive during the TWT schedule, and that corresponds to the TSPEC information element 300. As an illustrative example, the TS information field 320 includes a traffic stream identifier (TSID) that identifies a particular traffic stream that the client station will be transmitting and/or expects to receive during the TWT schedule, and that corresponds to the TSPEC information element 300, according to an embodiment. In an embodiment, the TS information field 320 is the same as or similar to the TS Info field defined by the IEEE 802.11 Standard.

A nominal MSDU size field 324 specifies a nominal size, in octets, of MSDUs or (where A-MSDU aggregation is employed) A-MSDUs belonging to the TS indicated by the TS information field 320, according to an embodiment. A maximum MSDU size field 328 specifies a maximum size, in octets, of MSDUs or A-MSDUs belonging to the TS indicated by the TS information field 320, according to an embodiment.

A minimum service interval field 332 specifies a minimum interval, in microseconds, between the start of two successive SPs, according to an embodiment. A maximum service interval field 334 specifies a maximum interval, in microseconds, between the start of two successive SPs, or indicates a latency limit, which limits the amount of aggregation (A-MSDU or A-MPDU) used, so that excessive latency does not occur, according to an embodiment.

An inactivity interval field 336 is specifies a minimum amount of time, in microseconds, that can elapse without arrival or transfer of an MPDU belonging to the TS (indicated by the TS information field 320) before the TS is deleted. A suspension interval field 340 specifies a minimum amount of time, in microseconds, that can elapse without arrival or transfer of an MSDU belonging to the TS (indicated by the TS information field 320) before the generation of successive poll frames is stopped for the TS indicated by the TS information field 320.

A service start time field 344 specifies a time, expressed in microseconds, when a first scheduled SP starts. The service start time field 344 indicates to the AP a time when the client station 154 first expects to be ready to send frames and the client station 154 needs to be in the wake state to receive frames. In some embodiments, service start time field 344 helps the AP to schedule SPs so that the MSDUs encounter small delays in the MAC layer and help the client station 154 to reduce power consumption.

A minimum data rate field 348 indicates a lowest data rate for transport of MSDUs or A-MSDUs belonging to the TS (indicated by the TS information field 320) within the bounds of other requirements indicated by the TSPEC information element 300. A mean data rate field 352 indicates a mean data rate for transport of MSDUs or A-MSDUs belonging to the TS (indicated by the TS information field 320) within the bounds of other requirements indicated by the TSPEC information element 300. A peak data rate field 356 indicates a maximum allowable data rate for transport of MSDUs or A-MSDUs belonging to the TS (indicated by the TS information field 320) within the bounds of other requirements indicated by the TSPEC information element 300.

A burst size field 360 indicates a maximum burst, in octets, of the MSDUs or A-MSDUs belonging to the TS (indicated by the TS information field 320) that arrive at a MAC processor at the peak data rate indicated by the peak data rate field 356.

A delay bound field 364 specifies a maximum amount of time, in microseconds, allowed to transport an MSDU or A-MSDU belonging to the TS (indicated by the TS information field 320), measured between a time marking the arrival of the MSDU, or the first MSDU of the MSDUs constituting an A-MSDU, at a local MAC sublayer and a time of completion of a successful transmission or retransmission of the MSDU or A-MSDU to the destination.

A minimum PHY rate field 368 indicates a minimum PHY rate for transport of MSDUs or A-MSDUs belonging to the TS (indicated by the TS information field 320) within the bounds of other requirements indicated by the TSPEC information element 300.

A surplus bandwidth allowance field 372 indicates an excess allocation of time (and bandwidth) over and above the stated application rates required to transport an MSDU or A-MSDU belonging to the TS indicated by the TS information field 320.

A medium time field 376 indicates an amount of time admitted to access a channel medium.

In other embodiments, one or more of the fields illustrated in FIG. 3 and/or one or more other fields (not shown) are included in the TSPEC information element 300 and/or the ordering of fields illustrated in FIG. 3 is changed.

In some embodiments, the TSPEC information element 300 is modified to include information for multiple traffic streams. For example, multiple instances of the fields 316-376 are included for multiple traffic streams, in an illustrative embodiment.

Referring now to FIGS. 2 and 3, in some embodiments, multiple TSPEC information elements (the same as or similar to the TSPEC information element 300), corresponding to different traffic streams, are included in the frame body 208 of the TWT setup frame 200.

Figure 4:
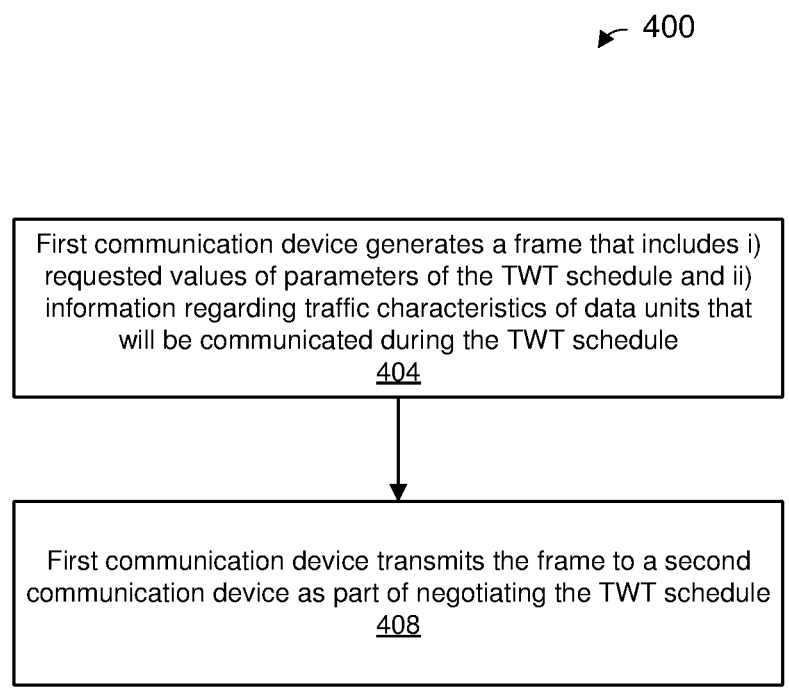
FIG. 4 is a flow diagram of an example method for negotiating a TWT schedule in a WLAN such as the WLAN of FIG. 1, according to another embodiment.

FIG. 4 is a flow diagram of an example method 400 for negotiating a TWT schedule in a WLAN, according to an embodiment. In some embodiments, the client station 154 is configured to implement the method 400, and FIG. 4 is described with reference to FIG. 1 merely for explanatory purposes. In other embodiments, the method 400 is implemented by another suitable communication device.

At block 404, a first communication device generates (e.g., the network interface 162 generates, the MAC processor 166 generates, the TWT request frame generator 190 generates, etc.) a frame that includes i) requested values of parameters of the TWT schedule and ii) information regarding traffic characteristics of data units that will be communicated during the TWT schedule.

In an embodiment, generating the frame at block 404 includes generating a frame such as the example frames described with reference to FIGS. 2 and 3.

In another embodiment, generating the frame at block 404 includes generating a frame that includes i) the requested values of parameters of the TWT schedule and ii) QoS requirement information regarding the data units that will be communicated during the TWT schedule.

In another embodiment, generating the frame at block 404 includes generating a frame that includes i) the requested values of parameters of the TWT schedule and ii) throughput requirement information regarding the data units that will be communicated during the TWT schedule.

In another embodiment, generating the frame at block 404 includes generating a frame that includes i) the requested values of parameters of the TWT schedule and ii) data rate requirement information regarding the data units that will be communicated during the TWT schedule.

In another embodiment, generating the frame at block 404 includes generating a frame that includes i) the requested values of parameters of the TWT schedule and ii) latency requirement information regarding the data units that will be communicated during the TWT schedule.

In another embodiment, generating the frame at block 404 includes generating a frame that includes i) the requested values of parameters of the TWT schedule and ii) a TSPEC information element regarding a traffic stream that will be communicated during the TWT schedule.

At block 408, as part of negotiating the TWT schedule, the first communication device transmits (e.g., the network interface 162 transmits, the PHY processor 170 transmits, etc.) the frame generated at block 404 to a second communication device that will participate in the TWT schedule.

In another embodiment, generating the frame at block 404 includes generating a TWT setup frame that includes i) requested values of parameters of the TWT schedule and ii) information regarding traffic characteristics of data units that will be communicated during the TWT schedule; and transmitting the frame at block 408 includes transmitting the TWT setup frame.

In some embodiments described below, an AP provides load information regarding broadcast TWT schedules within beacon frames, for example. Providing client stations with load information regarding broadcast TWT schedules assists client stations in avoiding broadcast TWT schedules that are already heavily loaded and/or selecting broadcast TWT schedules that are relatively less loaded, thus improving system throughput and/or client power saving, at least in some embodiments.

Figure 5:
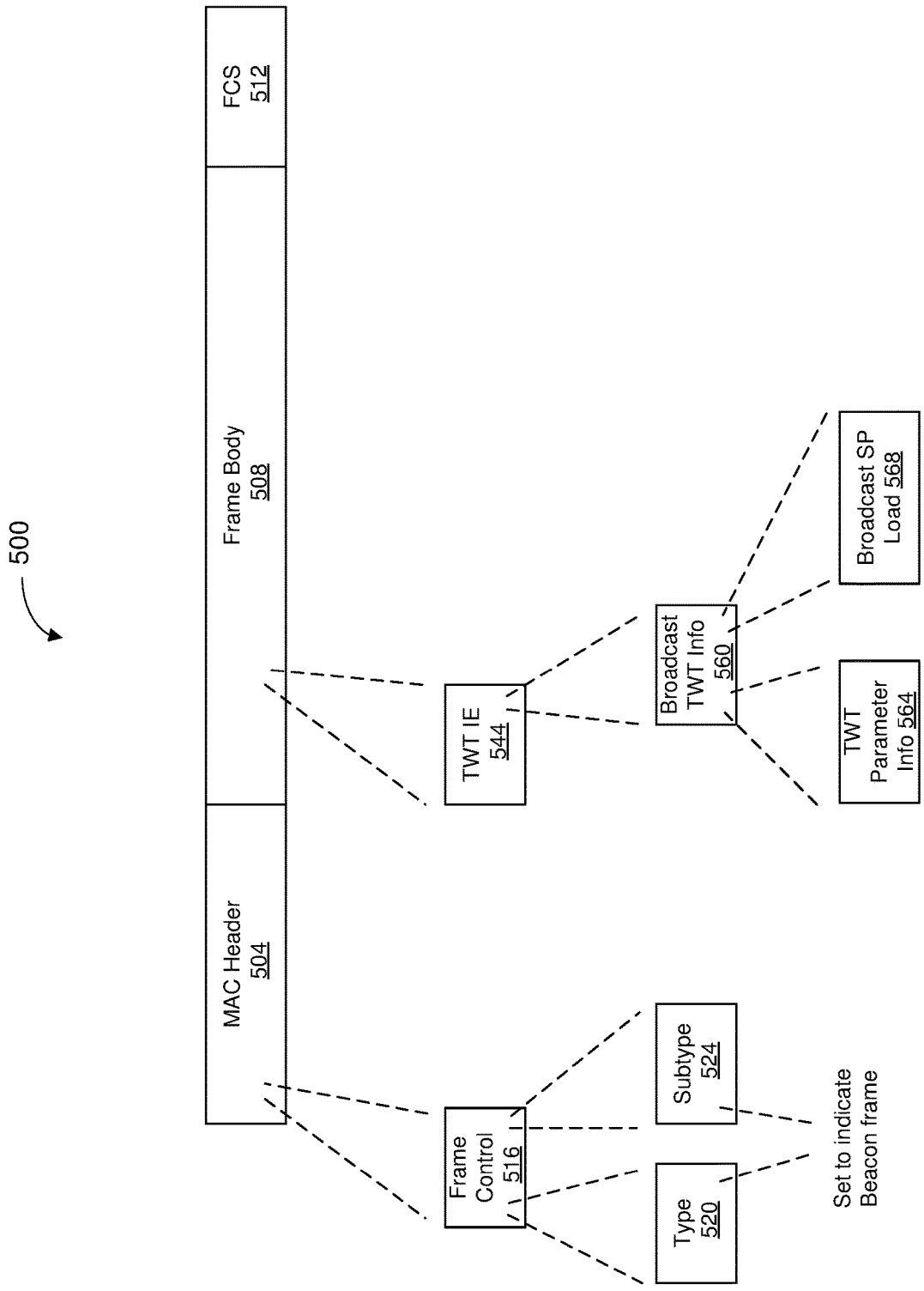
FIG. 5 is a diagram of an example beacon frame that includes parameters of a broadcast TWT schedule and information regarding a load of the broadcast TWT schedule, according to an embodiment.

FIG. 5 is a diagram of an example beacon frame 500 that a communication device in a WLAN generates and transmits to inform other communication devices of a broadcast TWT schedule and/or as part of negotiating a broadcast TWT schedule, according to an embodiment. For example, the network interface device 122 of the AP 114 (FIG. 1) is configured to generate and transmit the beacon frame 500 to inform other client stations 154 of a broadcast TWT schedule and/or as part of negotiating a broadcast TWT schedule, according to an embodiment. For instance, the MAC processor 126 is configured to (e.g., the beacon frame generator 140 is configured to, etc.) generate and transmit the beacon frame 500, according to an embodiment. The beacon frame 500 is described with reference to FIG. 1 merely for explanatory purposes. In other embodiments, the beacon frame 500 is generated and transmitted in other suitable wireless communication networks and/or generated/transmitted/processed by other suitable wireless communication devices in other embodiments.

The beacon frame 500 is useful, for example, for providing load information to client stations to inform client stations of a load of a broadcast TWT schedule that the client stations can use in selecting and/or negotiating a broadcast TWT schedule, according to some embodiments.

The beacon frame 500 includes a MAC header 504, a frame body 508, and an FCS field 512, according to an embodiment. The FCS field 512 includes error detection information (e.g., CRC information) corresponding to the MAC header 504 and the frame body 508, according to an embodiment.

The MAC header 504 includes a frame control field 516 having MAC layer information regarding the beacon frame 500. The frame control field 516 includes a type subfield 520 and a subtype subfield 524 set to indicate the frame 200 is a beacon frame. As a result of setting the type subfield 520 and the subtype subfield 524 to indicate the frame 500 is a beacon frame, receivers will assume the frame body 508 will have a format of an beacon frame when processing the frame 500.

The frame body 508 includes a TWT information element 544, which includes information regarding a broadcast TWT schedule. For example, the TWT information element 544 includes a broadcast TWT information field 560. The broadcast TWT information field 560 includes TWT parameter information corresponding to a broadcast TWT schedule. In various embodiments, the TWT parameter information comprise one of, or any suitable combination of two or more of, i) a start time of a broadcast TWT SP that is part of the broadcast TWT schedule, ii) a time period between broadcast TWT SPs of the broadcast TWT schedule, and iii) a duration of each broadcast TWT SP of the broadcast TWT schedule.

The broadcast TWT information field 560 also includes load information 568 regarding the broadcast TWT schedule to which the TWT IE 544 corresponds. In an embodiment, the broadcast load information 568 includes an indicator of a number of client stations that have currently joined the broadcast TWT schedule to which the TWT IE 544 corresponds. In some embodiments, the broadcast load information 568 assists client stations in avoiding broadcast TWT schedules that are already heavily loaded and/or selecting broadcast TWT schedules that are relatively less loaded, thus improving system throughput and/or client power saving, at least in some embodiments.

Figure 6:
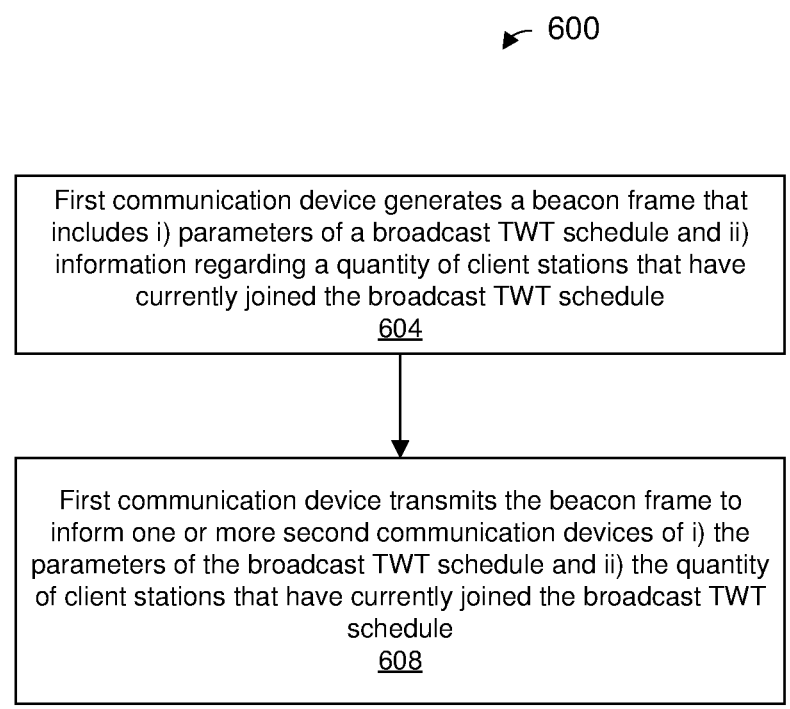
FIG. 6 is a flow diagram of an example method for providing information regarding a broadcast TWT schedule in a WLAN, according to an embodiment.

FIG. 6 is a flow diagram of an example method 600 for providing information regarding a broadcast TWT schedule in a WLAN, according to an embodiment. In some embodiments, the AP 114 is configured to implement the method 600, and FIG. 6 is described with reference to FIG. 1 merely for explanatory purposes. In other embodiments, the method 600 is implemented by another suitable communication device.

At block 604 a first communication device generates (e.g., the network interface 122 generates, the MAC processor 126 generates, the beacon frame generator 144 generates, etc.) a beacon frame that includes i) parameters of the broadcast TWT schedule and ii) information regarding a quantity of client stations that have currently joined the broadcast TWT schedule.

In some embodiments, generating the beacon frame at block 604 comprises generate a beacon frame such as described above with reference to FIG. 5.

In an embodiment, generating the beacon frame at block 604 comprises generating the beacon frame to include a TWT information element (such as the TWT information element 544 of FIG. 5) that includes information regarding the broadcast TWT schedule; and the method 600 further comprises the first communication generating (e.g., the network interface 122 generating, the MAC processor 126 generating, the beacon frame generator 144 generating, etc.) the TWT information element to include the information regarding the quantity of client stations that have currently joined the broadcast TWT schedule. In another embodiment, generating the TWT information element comprises: the first communication device generating (e.g., the network interface 122 generating, the MAC processor 126 generating, the beacon frame generator 144 generating, etc.) the TWT information element to include a field (such as the broadcast TWT information field 560 of FIG. 5) that includes i) information regarding the broadcast TWT schedule, and ii) a subfield (such as the broadcast SP load subfield 568 of FIG. 5) having the information regarding the quantity of client stations that have currently joined the broadcast TWT schedule.

At block 608, the first communication device transmits (e.g., the network interface 122 transmits, the PHY processor 130 transmits, etc.) the beacon frame generated at block 604 to inform one or more second communication devices of i) the parameters of the broadcast TWT schedule and ii) the quantity of client stations that have currently joined the broadcast TWT schedule.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for negotiating a target wake time (TWT) schedule in a wireless local area network (WLAN), the method comprising:
    generating, at a client station, a frame that includes i) requested values of parameters of the TWT schedule, ii) information regarding traffic characteristics of medium access control (MAC) layer data units that will be communicated during TWT service periods (SPs) of the TWT schedule, and iii) a traffic stream specification (TSPEC) information element regarding a traffic stream that will be communicated during the TWT schedule, wherein the information regarding traffic characteristics of MAC layer data units that will be communicated during TWT SPs of the TWT schedule comprises a first value specifying a data rate limit for MAC layer data units that will be communicated during TWT SPs of the TWT schedule, and wherein the TSPEC information element includes the first value specifying the data rate limit; and
    as part of negotiating the TWT schedule, transmitting, by the client station, the frame to an access point (AP) device that will participate in the TWT schedule to provide the AP device with the information regarding traffic characteristics for use by the AP device in determining the TWT schedule, the information regarding traffic characteristics including the first value specifying the data rate limit for MAC layer data units that will be communicated during TWT SPs of the TWT schedule.

2. The method of claim 1, wherein generating the frame comprises:
    generating the frame to include quality of service (QoS) requirement information regarding the data units that will be communicated during the TWT schedule, the QOS requirement information comprising the first value specifying the data rate limit.

3. The method of claim 1, wherein generating the frame comprises:
    generating the frame to include a second value corresponding to a maximum latency for MAC layer data units that will be communicated during TWT SPs of the TWT schedule.

4. The method of claim 1, wherein:
    generating the frame comprises generating a TWT setup frame that includes i) the requested values of parameters of the TWT schedule, ii) the information regarding traffic characteristics of data units that will be communicated during TWT SPs of the TWT schedule, and iii) the TSPEC information element; and
transmitting the frame comprises transmitting the TWT setup frame.

5. The method of claim 1, wherein generating the frame comprises:
generating the frame to include a second value specifying a mean data rate for MAC layer data units that will be communicated during TWT SPs of the TWT schedule.

6. The method of claim 1, wherein generating the frame comprises:
generating the frame to include a second value specifying a maximum size of MAC layer data units that will be communicated during TWT SPs of the TWT schedule.

7. The method of claim 1, wherein generating the frame comprises:
generating the frame to include a second value corresponding to a maximum interval between respective starts of two successive TWT SPs of the TWT schedule.

8. The method of claim 1, wherein the first value specifying a data rate limit for MAC layer data units that will be communicated during TWT SPs of the TWT schedule comprises:
a first value specifying one of i) a minimum data rate limit for MAC layer data units that will be communicated during TWT SPs of the TWT schedule, and ii) a maximum data rate limit for MAC layer data units that will be communicated during TWT SPs of the TWT schedule.

9. The method of claim 8, wherein generating the frame comprises:
generating the frame to include a second value specifying the other one of i) the minimum data rate limit for MAC layer data units that will be communicated during TWT SPs of the TWT schedule, and ii) the maximum data rate limit for MAC layer data units that will be communicated during TWT SPs of the TWT schedule.

10. A client station, comprising:
a wireless network interface device having one or more integrated circuit (IC) devices configured to:
generate a frame that includes i) requested values of parameters of a target wake time (TWT) schedule in a wireless local area network (WLAN), ii) information regarding traffic characteristics of medium access control (MAC) layer data units that will be communicated during TWT service periods (SPs) of the TWT schedule, and iii) a traffic stream specification (TSPEC) information element regarding a traffic stream that will be communicated during the TWT schedule, wherein the information regarding traffic characteristics of MAC layer data units that will be communicated during TWT SPs of the TWT schedule comprises a first value specifying a data rate limit for MAC layer data units that will be communicated during TWT SPs of the TWT schedule, and wherein the TSPEC information element includes the first value specifying the data rate limit, and
as part of negotiating the TWT schedule with the access point, control the wireless network interface device to transmit the frame to an access point (AP) device that will participate in the TWT schedule to provide the AP device with the information regarding traffic characteristics for use by the AP device in determining the TWT schedule, the information regarding traffic characteristics including the first value specifying the data rate limit for MAC layer data units that will be communicated during TWT SPs of the TWT schedule.

11. The client station of claim 10, wherein the one or more IC devices are further configured to:
generate the frame to include quality of service (QoS) requirement information regarding the data units that will be communicated during the TWT schedule, the QOS requirement information comprising the first value specifying the data rate limit.

12. The client station of claim 10, wherein the one or more IC devices are further configured to:
generate the frame to include a second value corresponding to a maximum latency for MAC layer data units that will be communicated during TWT SPs of the TWT schedule.

13. The client station of claim 10, wherein the one or more IC devices are configured to:
generate the frame as a TWT setup frame that includes i) the requested values of parameters of the TWT schedule, ii) the information regarding traffic characteristics of data units that will be communicated during TWT SPs of the TWT schedule, and iii) the TSPEC information element; and
control the wireless network interface device to transmit the TWT setup frame.

14. The client station of claim 10, wherein the one or more IC devices are further configured to:
generate the frame to include a second value specifying a mean data rate for MAC layer data units that will be communicated during TWT SPs of the TWT schedule.

15. The client station of claim 10, wherein the one or more IC devices are further configured to:
generate the frame to include a second value specifying a maximum size of MAC layer data units that will be communicated during TWT SPs of the TWT schedule.

16. The client station of claim 10, wherein the one or more IC devices are further configured to:
generate the frame to include a second value corresponding to a maximum interval between respective starts of two successive TWT SPs of the TWT schedule.

17. The client station of claim 10, wherein the first value specifying a data rate limit for MAC layer data units that will be communicated during TWT SPs of the TWT schedule comprises:
a first value specifying one of i) a minimum data rate limit for MAC layer data units that will be communicated during TWT SPs of the TWT schedule, and ii) a maximum data rate limit for MAC layer data units that will be communicated during TWT SPs of the TWT schedule.

18. The client station of claim 17, wherein the one or more IC devices are further configured to:
generate the frame to include a second value specifying the other one of i) the minimum data rate limit for MAC layer data units that will be communicated during TWT SPs of the TWT schedule, and ii) the maximum data rate limit for MAC layer data units that will be communicated during TWT SPs of the TWT schedule.

\* \* \* \* \*